US012650764B2

(12) United States Patent
Saffo et al.

(10) Patent No.: US 12,650,764 B2
(45) Date of Patent: Jun. 9, 2026

(54) SYSTEMS AND METHODS FOR USING STENCILS FOR MULTITOUCH INTERACTIVE EXPLORATION

(71) Applicant: JPMORGAN CHASE BANK, N.A., New York, NY (US)

(72) Inventors: David Saffo, New York, NY (US); Ricardo Gonzalez, Jersey City, NJ (US); Fannie Liu, Brooklyn, NY (US); Blair Macintyre, Westwood, MA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/450,938

(22) Filed: Aug. 16, 2023

(65) Prior Publication Data

US 2025/0060869 A1     Feb. 20, 2025

(51) Int. Cl.
*G06F 3/0488* (2022.01)
*G06F 3/16* (2006.01)

(52) U.S. Cl.
CPC ............ *G06F 3/0488* (2013.01); *G06F 3/167* (2013.01)

(58) Field of Classification Search
CPC .. G09B 21/003; G09B 21/007; G09B 21/008; G09B 21/006; G09B 21/004; G09B 21/002; G09B 21/04; G09B 7/00; G06F 3/04886; G06F 2203/04809; G06F 3/016; G06F 3/0393; G06F 1/1607; G06F 3/044; G03G 15/5016
See application file for complete search history.

(56) References Cited

U.S. PATENT DOCUMENTS

| | | | | |
|---|---|---|---|---|
| 8,482,540 | B1 * | 7/2013 | Reeves | G06F 3/0393 |
| | | | | 345/173 |
| 10,852,858 | B2 * | 12/2020 | Paik | G06F 3/04162 |
| 2003/0184524 | A1 * | 10/2003 | Stohrer | G03G 15/5016 |
| | | | | 345/173 |
| 2014/0274214 | A1 * | 9/2014 | Kim | H04M 1/0266 |
| | | | | 455/566 |
| 2015/0186038 | A1 * | 7/2015 | Guo | G06F 3/04886 |
| | | | | 715/773 |
| 2019/0064885 | A1 * | 2/2019 | Paik | G06F 1/1632 |
| 2020/0106955 | A1 * | 4/2020 | Fleizach | H04N 23/64 |
| 2020/0251074 | A1 * | 8/2020 | Suryanarayana | G06F 3/04845 |
| 2022/0269309 | A1 * | 8/2022 | Pike | G06F 3/0393 |

* cited by examiner

*Primary Examiner* — Sujit Shah
(74) *Attorney, Agent, or Firm* — GREENBERG TRAURIG LLP

(57) ABSTRACT

Systems and methods for using stencils for multitouch interactive exploration are disclosed. In one embodiment, a method may include: (1) receiving, by a computer program executed ay an electronic device, an identification of a stencil being used over a touch-sensitive interface associated with the electronic device, the stencil comprising a plurality of physical markers; (2) graphically presenting, by the computer program, a graphical representation of data on the touch-sensitive interface; (3) receiving, by the computer program, a user touch interaction with the touch-sensitive interface; (4) providing, by the computer program, feedback for the user touch interaction; (5) determining, by the computer program, a location of the user touch interaction on the stencil; (6) identifying, by the computer program, an element at the location; and (7) audibly providing, by the computer program, information on the element.

14 Claims, 7 Drawing Sheets

100
130
120
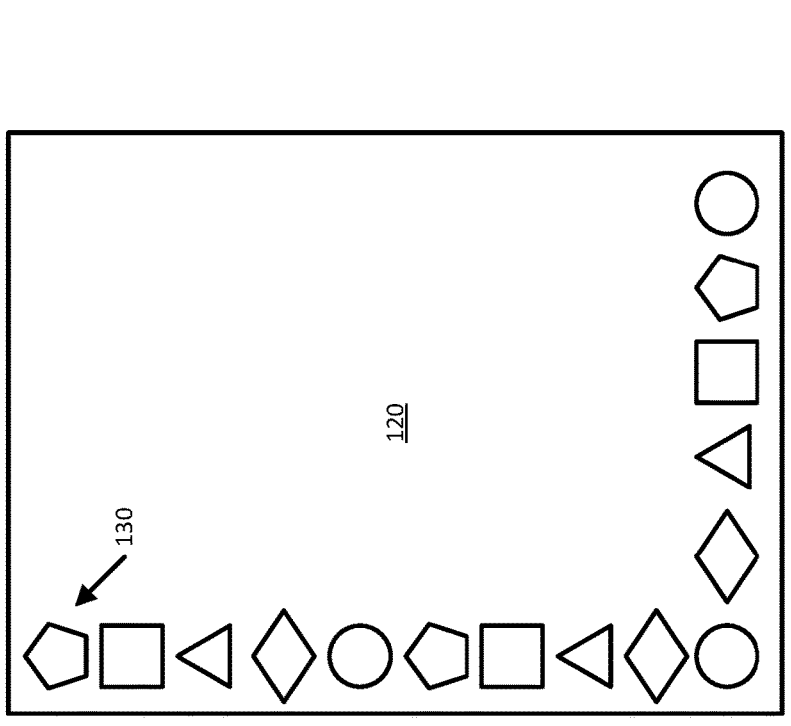
110
Memory
(112)
Program(s)
(113)
Touch-sensitive Interface
(114)
Feedback Device(s)
(116)
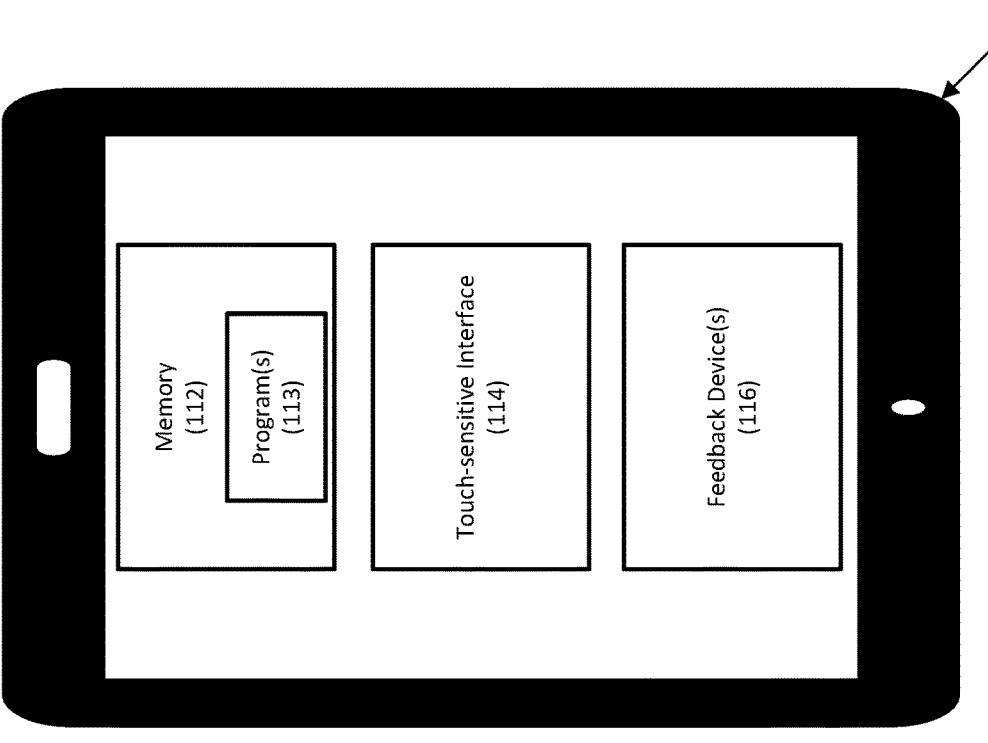
FIGURE 1

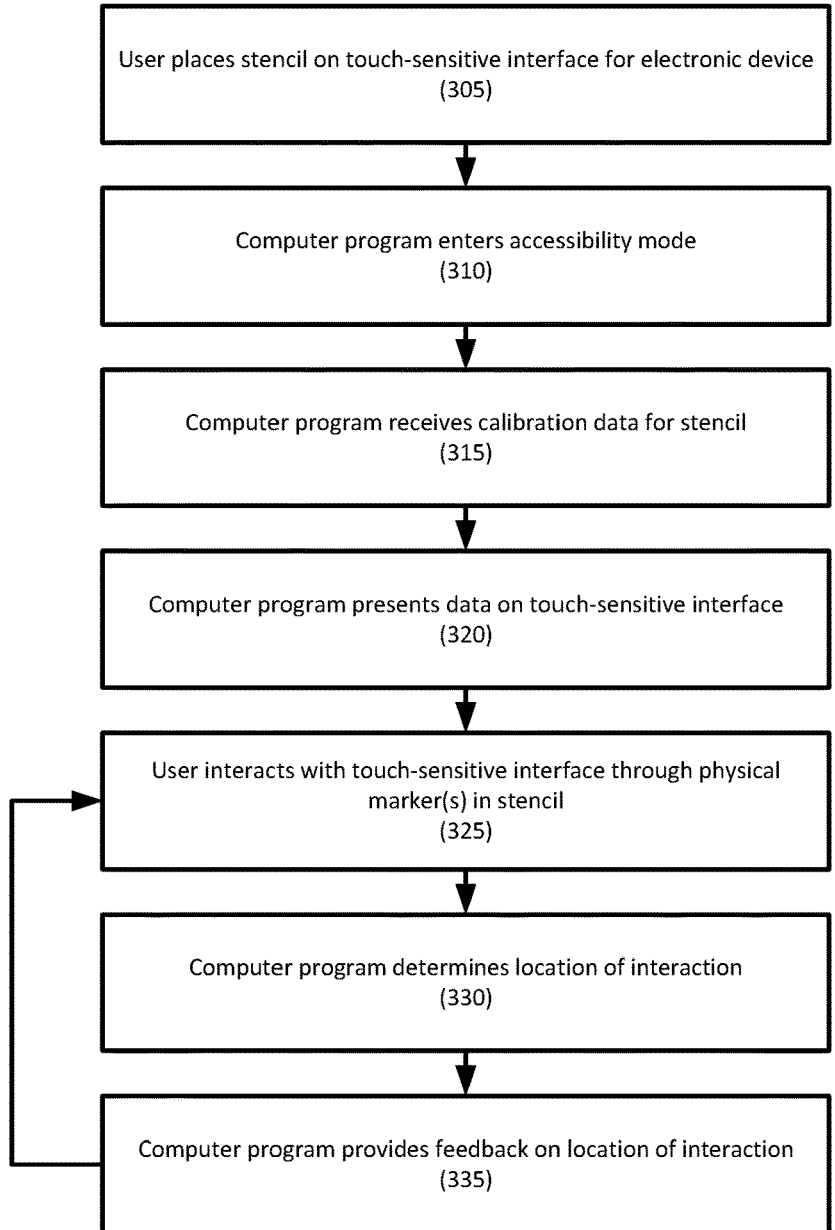

User places stencil on touch-sensitive interface for electronic device
(305)

Computer program enters accessibility mode
(310)

Computer program receives calibration data for stencil
(315)

Computer program presents data on touch-sensitive interface
(320)

User interacts with touch-sensitive interface through physical
marker(s) in stencil
(325)

Computer program determines location of interaction
(330)

Computer program provides feedback on location of interaction
(335)

FIGURE 3

SYSTEMS AND METHODS FOR USING STENCILS FOR MULTITOUCH INTERACTIVE EXPLORATION

BACKGROUND OF THE INVENTION

1. Field of the Invention

Embodiments are generally directed to systems and methods for using stencils for multitouch interactive exploration.

2. Description of the Related Art

Blind and low vision individuals primarily access graphics, particularly two dimensional data visualizations (e.g., bar charts, line charts, pie charts, and scatter plots), through screen reader technology and sonification. Both of these methods offer limited sense-making techniques for such users to independently explore data.

Screen reader technology, however, requires authors of data visualizations to include extensive alternative text describing the data. In the absence of alternative text, blind users can only access raw tabular data in a linear manner. Thus, blind users are constrained to accessing values sequentially, and to what authors of data visualizations verbally capture in their descriptions. This greatly hinders blind users' agency and ability to draw insights from the dataset.

Sonification uses audio clips in the form of artificial, musical, or natural sounds to communicate categorical or quantitative values in large datasets. Sense making is achieved by altering the volume, pitch, or type of sound to represent different properties of the data (e.g., class, type, value, etc.). For example, for a bar chart displaying 36 months of earning reports of five market segments of a company, the data visualization author might assign one unique sound representing a natural sound (e.g., water trickling down a river, fire ablaze, a rooster, a woodpecker, and a parrot) to communicate the earnings of each market segment. Then, the author might also assign volume loudness of each sound depending on the earnings amount of each segment (e.g., louder for higher values, and quieter for lower values). The result is that the blind or low vision person can differentiate between sound signatures playing in parallel due to the "uniqueness" of each sound. Thus, blind and low vision persons can acquire a general sense of differences between earnings of the different market segments month-over-month and year-over-year.

Nevertheless, sonification also comes with drawbacks. First, there is a limit to the number of unique sounds that the user can differentiate playing simultaneously. Next, the user's "auditory" attention is limited to one sound signature in most cases. Thirdly, it is challenging to differentiate loudness of sounds when comparing both significantly different types of sound signatures and small variations in loudness of sound.

SUMMARY OF THE INVENTION

Systems and methods for using stencils for multitouch interactive exploration are disclosed. In one embodiment, a method may include: (1) receiving, by a computer program executed ay an electronic device, an identification of a stencil being used over a touch-sensitive interface associated with the electronic device, the stencil comprising a plurality of physical markers; (2) graphically presenting, by the computer program, a graphical representation of data on the touch-sensitive interface; (3) receiving, by the computer program, a user touch interaction with the touch-sensitive interface; (4) providing, by the computer program, feedback for the user touch interaction; (5) determining, by the computer program, a location of the user touch interaction on the stencil; (6) identifying, by the computer program, an element at the location; and (7) audibly providing, by the computer program, information on the element.

In one embodiment, the stencil may include a first group of the physical markers in a first axis, and a second group of the physical markers in a second axis.

In one embodiment, the stencil may include an overlay and at least some of the physical markers comprise cut-outs in the overlay.

In one embodiment, the stencil may include an overlay and at least some of the physical markers comprise raised portions in the overlay.

In one embodiment, at least one of the physical markers may include a quadrant marker.

In one embodiment, the method may also include: receiving, by the computer program, calibration data for the stencil, wherein the calibration data may include a location of each physical marker; and resizing, by the computer program, the graphical representation of data based on the calibration data.

In one embodiment, the method may also include adjusting, by the computer program, the graphical representation of data based on a pixel density and/or size of the touch-sensitive interface.

In one embodiment, the graphical representation of data may include a graph.

In one embodiment, the graphical representation of data may include a plurality of action items.

In one embodiment, the electronic device may include a tablet computer, a monitor, or a kiosk.

According to another embodiment, a system may include a stencil comprising a plurality of physical markers; and an electronic device comprising: a computer processor; a memory storing a computer program; and a touch-sensitive interface, When read and executed by the computer processor, the computer program causes the computer processor to receive an identification of the stencil being used over the touch-sensitive interface, graphically present a graphical representation of data on the touch-sensitive interface, receive a user touch interaction with the touch-sensitive interface, provide feedback for the user touch interaction, determine a location of the user touch interaction on the stencil, identify an element at the location, and cause information to be audibly provided on the element.

In one embodiment, the stencil may include a first group of the physical markers in a first axis, and a second group of the physical markers in a second axis.

In one embodiment, the stencil may include an overlay and at least some of the physical markers comprise cut-outs in the overlay.

In one embodiment, the stencil may include an overlay and at least some of the physical markers comprise raised portions in the overlay.

In one embodiment, at least one of the physical markers may include a quadrant marker.

In one embodiment, when read and executed by the computer processor, the computer program causes the computer processor to receive calibration data for the stencil, wherein the calibration data may include a location of each physical marker, and resize the graphical representation of data based on the calibration data.

In one embodiment, when read and executed by the computer processor, the computer program causes the computer processor to adjust the graphical representation of data based on a pixel density and/or size of the touch-sensitive interface.

In one embodiment, the graphical representation of data may include a graph.

In one embodiment, the graphical representation of data may include a plurality of action items.

In one embodiment, the electronic device may include a tablet computer, a monitor, or a kiosk.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

FIG. 1 depicts a system for using stencils for multitouch interactive exploration according to an embodiment;

FIG. 3 depicts a method for using stencils for multitouch interactive exploration according to an embodiment.

DETAILED DESCRIPTION OF PREFERRED EMBODIMENTS

Figure 2A:
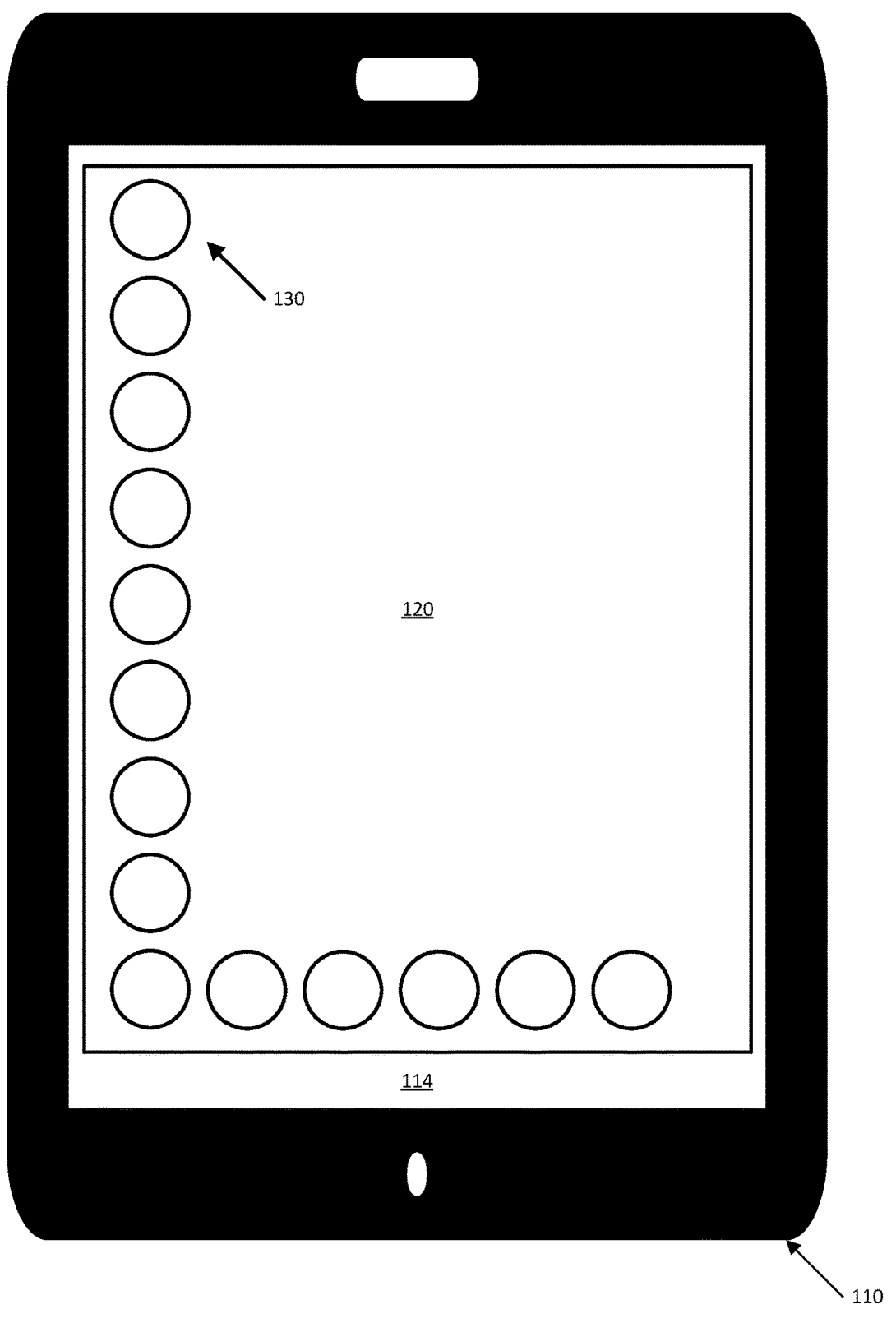
FIGS. 2A, 2B, 2C, and 2D depict exemplary stencils according to embodiments.

Systems and methods for using stencils for multitouch interactive exploration are disclosed.

Embodiments are directed to presenting a graphical representation of data on touchscreen devices in conjunction with physical tactile overlays, called "stencils." The stencils may be superimposed on touchscreen surfaces, thereby enabling semantic connections to dynamic digital content that users can physically touch. Embodiments overcome screen reader and sonification limitations by grounding the experience of data exploration in physical layouts that function as landmarks. These physical layouts leverage the users' spatial reasoning and tactile perception, as well as touchscreen technology, to create precise and natural ways of interacting with datasets through multi-finger gestures.

For example, an X-Y stencil may have an X-axis and a Y-axis with a series of uniquely shaped physical markers. The stencil may be overlaid on a touchscreen device that may display a graphical representation of data with an X- and Y-axis. Users may move or scrub, for example, their left-hand index finger on the X-axis to anchor their orientation and position within the stencil as it relates to the visualization (e.g., they can rub their finger on to a tick marker which indicates the 500.000 mark), and then they may move, for example, their right-hand index finger vertically to quickly survey if there are any points in the Y-axis. Users may also perform gestures (e.g., drawing a circle on the touchscreen) to select datapoints within the dataset and execute functions or queries on those datapoints (e.g., find highest value, calculate average, ask an AI agent about the selected datapoints).

In one embodiment, to establish the context of the exploration of the data, the screen reader computer program may announce general information about the data visualization that is presented on the touchscreen device. For example, users may be provided with the title of the data visualization, a commentary of the data visualization author, the location of the axes of the graphical representation of data, what the axes represent, the number of data points, etc. When the axes are described, users may be informed of: (1) the type of data that the axis conveys (e.g., categorical or quantitative continuous); (2) the extent of the scale of the axis (e.g., the number of markers used, and/or minimum and maximum scale values); (3) the meaning of the intervals between markers in the axis (e.g., for categorical data, it may be understood that each marker belongs to one category; for quantitative continuous/discrete data, there may be a numerical meaning to the physical distance of separation); etc. Thus, the connection between a physical touch landmark and a value of the data is established.

After obtaining a general overview of the data, the user may start exploring the graphical representation of data using the stencil to begin the sensemaking process. Users may move their fingers over the touchscreen surface until they find a physical marker to ground their location within the data visualization canvas. While the users are moving their fingers over the touchscreen, the touchscreen may sense the touch and communicate the reception of the user's finger location by, for example, playing a looping audio of a chorded sinewave. Other sounds and/or haptic feedback may be provided. Whenever the users move their fingers over a digital element, a unique audio cue may be played to convey the user has encountered some element of interest (e.g., a datapoint, a marker, an axis, etc.). The user can then decide whether the audio cue is meaningful or not, and if it is, can hold the finger in the position where the audio cue was played to receive details on the element of interest. The touchscreen may also provide haptic feedback, which may communicate the acknowledgement of the request of information.

Depending on the type of element that the user is holding their finger on, the screen reader computer program may read aloud a description of the element. For example, for a datapoint, the value of the data may be announced. For a physical marker, the position of the marker within the scale, and how many datapoints are located within its "view" may be announced (e.g., for markers in the X axis, how many points are within the column space above the marker, and for markers in the Y axis, how many points are within the row space to the right of the marker). For an axis, the scale and step increase may be announced.

Users may contextualize the data exploration in several ways. For example, using their non-dominant hand, users may perform a long press over the canvas and scrub over a physical marker to establish the location of data points and potential targets of interest. Users can establish a proprioceptive physical landmark, establish potential number of targets within the physical landmark vicinity and then use their dominant hand to move within the data canvas in relation to the position of their non-dominant finger hovering over the physical landmark.

Users may also select a "range" of interest by touching two physical landmarks within an axis. This selection may remap the values located within the two selected physical landmarks into a "new" temporal view context that arranges itself with respect to all the physical landmarks. This may be especially useful when there are many values that are close together or overlapping, or to check specific categories, values, or periods in time.

Whenever the user performs a zoom-in or zoom-out operation (selecting a range of interest and filtering), the user may be informed of the changes of context in meaning of the physical landmarks. For example, the "new" scale extent, and the interval increase between markers. This is to minimize the time required to recontextualize user exploration as they should be already familiar with the data they are exploring.

The user navigation actions may be stored within a stack data structure, which may allow users to undo or redo navigation operations. Undo and redo operations are fundamental for blind and low vision persons, and for data visualization activities in general, as users are likely to make mistakes, or the desired objective is not achievable in the first attempt. These commands may be executed by, for example, performing a swipe gesture to the left (e.g., undo) or to the right (e.g., redo) with two fingers on the screen.

Users may also request, on-demand, recently heard screen reader messages in an equivalent manner through a gesture, such as by swiping three fingers to the left for previous heard message, and three fingers to the right for latest message heard).

When there are multiple overlapping elements under the user's finger, embodiments may offer the user a filtering option, and the user may select a specific range of values, which may remap the data to new context. Alternatively, embodiments may execute a high-priority intersection screen reading algorithm. All elements that are under the user's finger within a circumference of pixels may be identified, and may be listed to the user in some preestablished order of importance or user preference (e.g., Datapoint>Marker>Axis). Thus, the user is provided with the highest priority element.

In another embodiment, to remap the current view and perform a zoom in operation, the user may find two physical markers that represent a range of interest and may then select those markers (e.g., by double-tapping each of them). All values that are within the two physical markers selected may be remapped to the entirety of the display.

Although embodiments are described in the context of data visualizations, such as graphs, plots, etc., it should be recognized that embodiments may be used with any sort of graphical display, including graphical user interfaces. For example, each physical marker may be associated with an action item on the graphical user interface. Examples of action items include navigational items for navigating the operating system of the electronic device, control interfaces, etc. By navigating through the stencil, the user may select the appropriate action in the graphical user interface.

For example, each physical marker in the stencil may be associated with one or more graphical user elements in its respective axis. In this way, the screen reader computer program prompts may provide users with an overview of what graphical elements are at the X-Y physical marker intersections. Users may explore the physical markers until they identify the graphical element of interest, and select that point.

When graphical elements change, the screen reader computer program prompts are updated so that the physical markers reference the new element states, positions, and content accordingly.

Referring to FIG. 1, a system for using stencils for multitouch interactive exploration is disclosed according to an embodiment. System 100 may include electronic device 110, which may be any suitable electronic device, including computers (e.g., workstations, desktops, laptops, notebooks, tablets, terminals, etc.), smart devices (e.g., smart phones), kiosks (e.g., automated teller machines, check-in kiosks), Internet of Things (IoT) appliances, etc. Electronic device 110 may include memory 112 that may store one or more computer programs 113, touch-sensitive interface 114, such as a touch-sensitive screen or a touch pad, and feedback device(s) 116, such as an audio feedback device (e.g., a speaker), a haptic feedback device, etc.

Touch-sensitive interface 114 may be provided as an accessory for electronic device 110.

Computer program(s) 113 may interface with the operating system for electronic device 110 and may monitor the location and/or type of touches on touch-sensitive interface 114. Computer program 113 may be part of, or may be an extension for a graphical presentation computer program. In another embodiment, computer program 113 may be part of the operating system. Computer program 113 may provide screen reading capability that may provide audio information on an element or elements being touched. Computer program 113 may sense touches, gestures, etc. as is necessary and/or desired.

In one embodiment, electronic device 110 may be a monitor, a screen, etc.

Computer program 113 may also adjust the size of the information being displayed based on properties of stencil 120 being used.

System 100 may further include stencil 120, which may be an overlay with a plurality of physical markers 130, such as cut-outs, raised portions, etc. Stencil 120 may have a thickness of a screen protector, such as a tempered glass screen protector or similar. In another embodiment, stencil 120 may be similar to a film screen protector.

In one embodiment, stencil 120 may be placed over touch-sensitive interface 114 so that a user's touch may be sensed by touch-sensitive interface 114.

In another embodiment, stencil 120 may be an integral part of touch-sensitive interface 114.

Physical markers 130 may help with the user's spatial reasoning. For example, physical markers 130 may have an X-Y arrangement, with one group extending in a vertical direction and another in a horizontal direction. A user may use the axes of physical markers 130 to determine a location on touch-sensitive interface of electronic device 110.

Figure 2B:
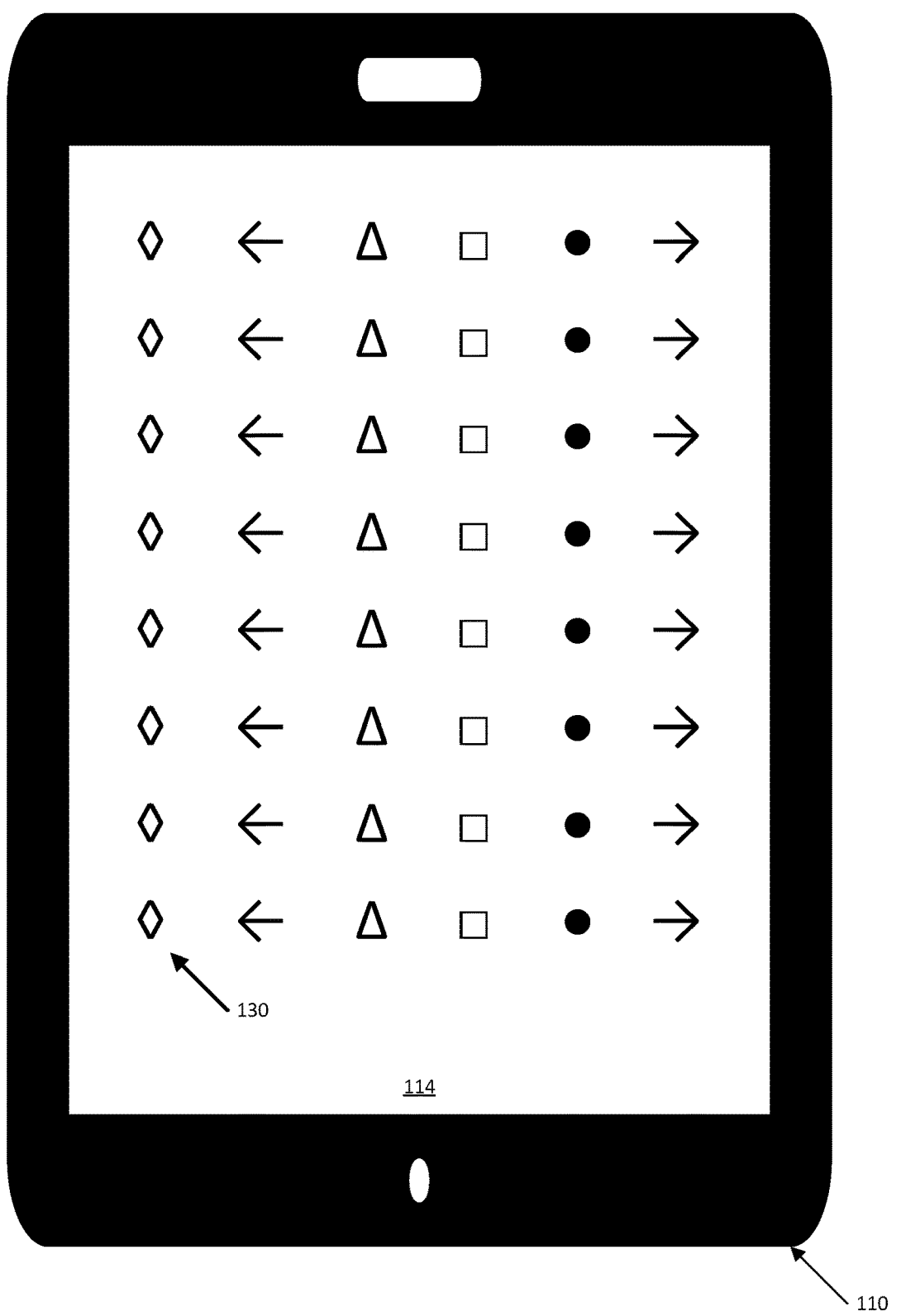
Figure 2C:
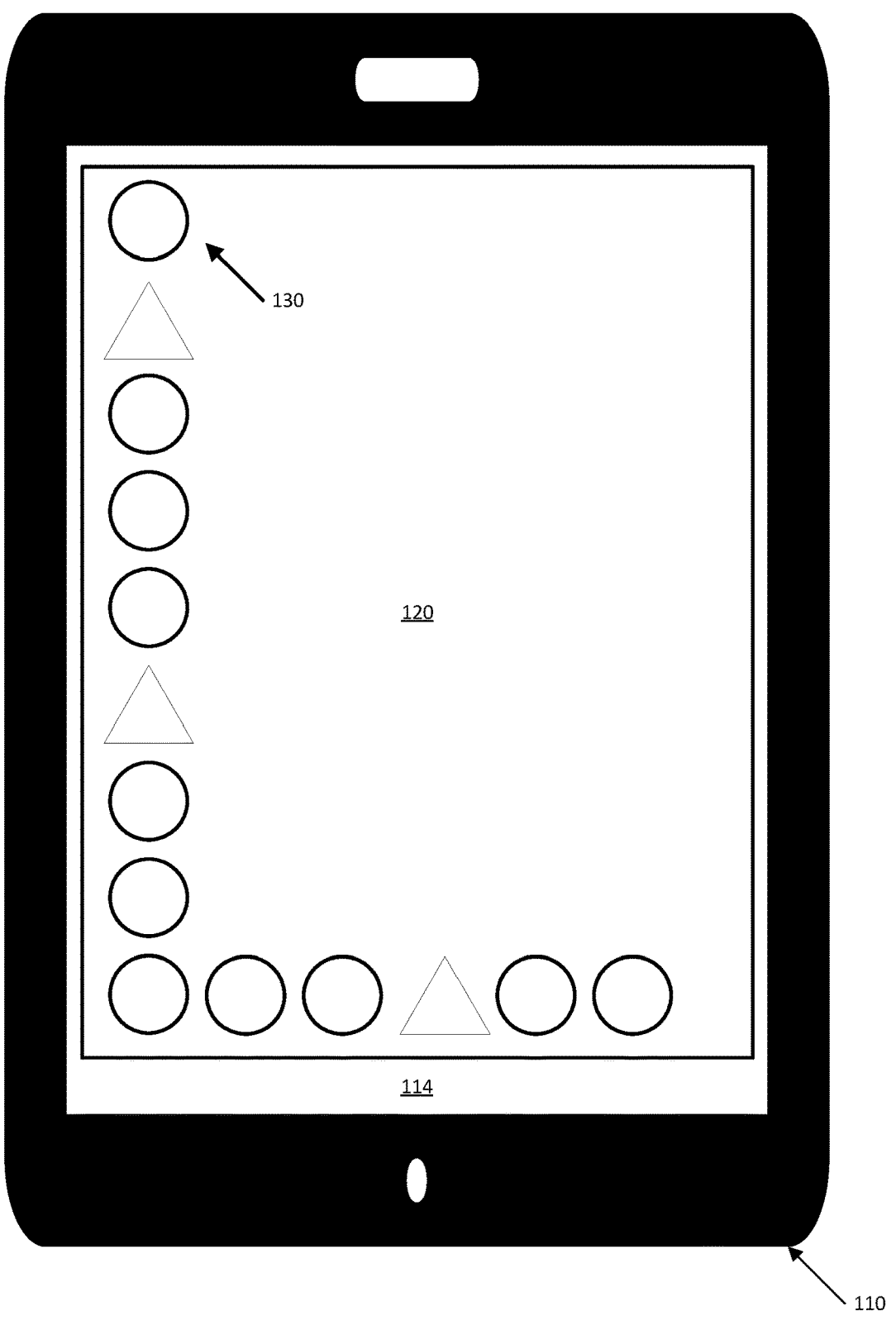

Additional examples of stencil 120 are provided in FIGS. 2A, 2B, and 2C. In FIG. 2A, physical markers 130 may have the same shape, and FIG. 2B, each column of physical markers 130 may have the same shape, while different rows may have different shapes or a repeating pattern. In another embodiment, the physical markers 130 in each column may be different, or have a repeating pattern, while the physical markers 130 in the rows may be the same.

In one embodiment, every certain number of physical markers 130 may be a quadrant marker that may help the user locate markers or digital elements of interest faster. FIG. 2C depicts the quadrant marker as the triangle.

In another embodiment, a shape of one of physical markers 130 may be a quadrant marker. For example, in FIG. 1, the circle shape may be a quadrant marker.

Figure 2D:
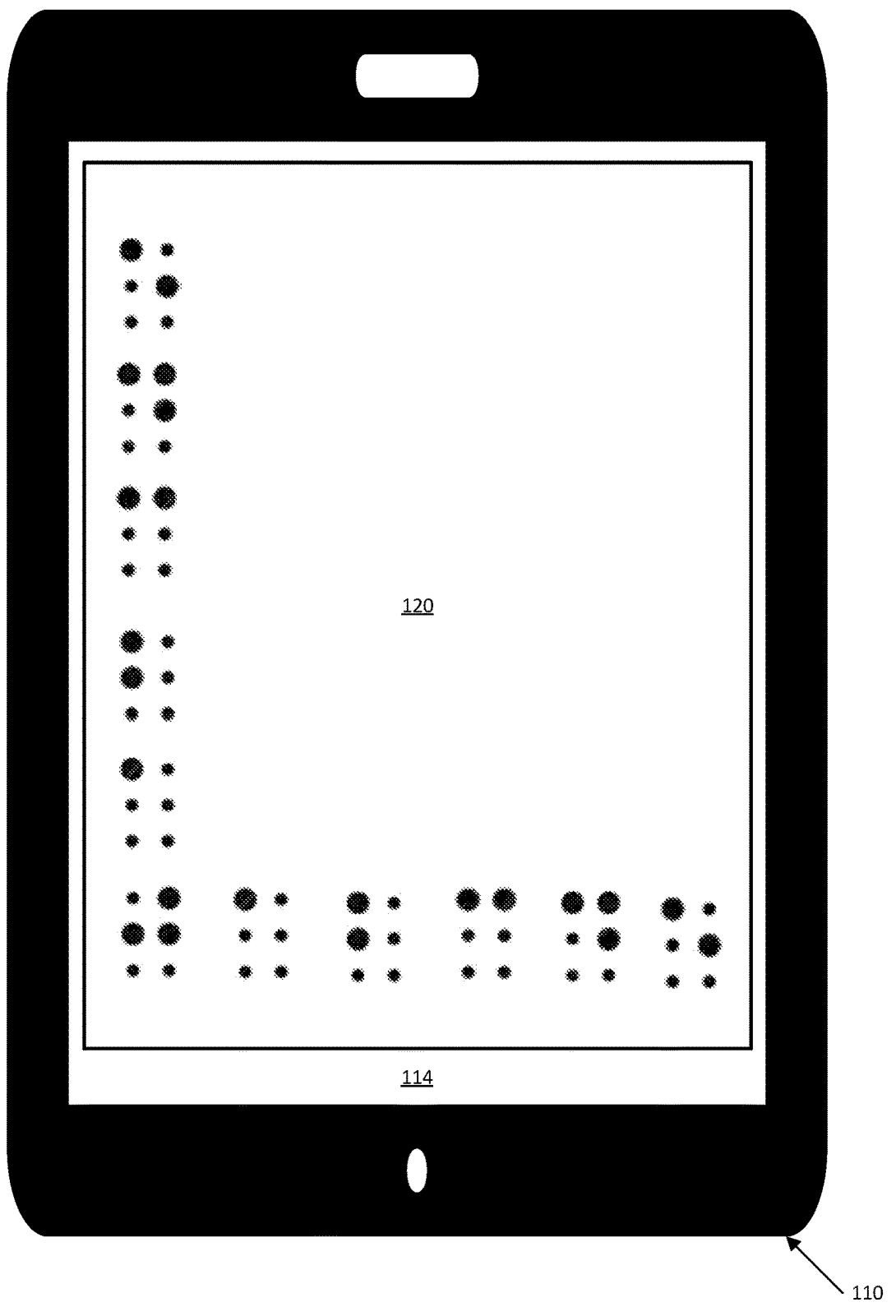

Referring to FIG. 2D, in another embodiment, physical markers 130 may be Braille or Nemeth Braille notation cutouts or embossed plastic, which would be especially useful for advanced Braille reader users. Braille reader users may thus leverage their familiarity with Braille code to increase the speed by which they can locate data of interest.

Other suitable implementations of stencils 120, including combinations of any of the above approaches, may be used as is necessary and/or desired.

Referring again to FIG. 1, in one embodiment, a user may customize stencil 120 as is necessary and/or desired, and may provide the stencil properties (e.g., spacings, element types, locations, etc.) to computer program for calibration. In another embodiment, the user may place stencil 120 over touch-sensitive interface 114 and the computer program may walk the user through a process touching each physical marker 130 one-by-one to calibrate the software. The computer program may then adapt the graphical representation of data based on the calibration data.

In one embodiment, based on the location of physical markers 130, the computer program may adjust the scale for the X-axis and the Y-axis so that the minimum data value matches with the first physical marker and the maximum data value matches with the last physical marker. This may be done on a linear, log, exponential, ordinal, or categorical scale.

The computer program may then match the data points that are located in the axis of physical markers 130. This may be used to generate the screen reader prompts for the summary and other touch interactions.

In another embodiment, the computer program may automatically adapt the graphical display to the dimensions of the electronic device, regardless of the size of the touch-sensitive interface. The computer program may identify the pixel density and screen size information. For example, the computer program may extract screen size information about electronic device 110, including the density of pixels on touch-sensitive interface 114. In one embodiment, upon start-up, the computer program can detect whether it is running on a computer, an Android device an iOS device, etc., and may obtain information about the hardware specifications from, for example, a pre-loaded database. With this information, the computer program may determine the locations and size of the physical markers, datapoints, and locations of all the interactive elements in the display on the touch-sensitive interface.

In one embodiment, the computer program may use the locations and sizes of the data points to adjust the graphical display so they match the stencil.

An example of such is as follows. The computer program may adapt to different pixel densities to consistently generate a digital representation of a stencil for a device that is 20 cm wide by 15 cm in height. The stencil may have physical markers 130 that are 0.2 cm wide every 1 cm and quadrant markers every 5 cm to denote quadrants. On a lower pixel density screen (e.g., a 40 pixels per centimeter screen), a digital representation of physical marker 130 may be 30 pixels long (0.75 cm in physical dimensions). Meanwhile, on a higher pixel density screen (e.g., a 120 pixels per centimeter screen), a digital representation of physical marker 130 may be 90 pixels long (e.g., 0.75 cm in physical dimensions).

Thus, calibration may include calibration based on the stencil, and calibration based on the pixel density and screen size for the electronic device.

In one embodiment, stencil 120 may include an identifier (not shown), such as a radio frequency tag (e.g., a NFC tag), a machine readable code (e.g., a QR code), etc. that may be used to provide information on the stencil to the computer program.

The user may interact with touch-sensitive interface 114 through any suitable type of touch, including single finger and multiple figure taps (e.g., single taps, double taps, etc.), single and multiple finger long presses, single and multiple finger pans, single and multiple finger gestures, etc. The type of interaction may be set as a default (e.g., a single tap under the horizontal axis causes the computer program to audibly provide axis information, a single finger double tap on a data element selects the data point, etc.), or these may be defined by the user as is necessary and/or desired.

Referring to FIG. 3, a method for using stencils for multitouch interactive exploration is disclosed according to an embodiment.

In step 305, a user may place a stencil over a touch-sensitive interface, such as a touch sensitive screen, a touch pad, etc., of an electronic device. In one embodiment, the stencil may include cutouts or markers that may be used by a user to sense a position on the touch-sensitive interface.

In one embodiment, the electronic device may include a computer, a smart device, a kiosk, or an accessory therefor.

In step 310, a computer program executed by the electronic device may optionally enter an accessibility mode, such as a mode for blind or low-visibility individuals. In one embodiment, the user may instruct the computer program to enter accessibility mode; in another embodiment, the computer program may automatically enter accessibility mode based on sensing the presence of the stencil on the touch-sensitive interface.

In step 315, the computer program may optionally receive calibration data for the stencil, such as the location of each physical marker in the stencil, a scale of the axes, etc. In one embodiment, the computer program may instruct the user to move the user's finger across the screen, and the computer program may sense the location of the physical marker in the stencil.

In another embodiment, the user may upload an image of the stencil and the computer program may determine the location of the physical marker in the stencil from the image. In another embodiment, the computer program may identify the stencil using a RF code, a machine-readable code, etc. Once the calibration data is received, the computer program may resize the graphical representation of data based on the calibration data.

In one embodiment, the computer program may retrieve information on the electronic device, such as the screen size and pixel density, and may generate virtual versions of the physical markers for the stencil. The virtual versions of the physical markers correspond to the locations of the physical markers on the stencil.

The virtual versions of the physical markers may be provided for individuals that may still have usable vision but cannot rely on that vision to draw accurate insights or generally read data. The virtual versions of the physical markers may also be used by developers during development to debut data representations.

In step 320, the computer program may present the graphical representation of data on the touch-sensitive interface, such a touch-sensitive screen. The data may include any type of graphical data.

In step 325, the user may interact with the touch-sensitive interface through the physical markers in the stencil. The computer program may provide feedback (e.g., audible feedback, haptic feedback, etc.) in response to sensing the user's touch. For example, the feedback may identify the physical marker that is being touched (e.g., "fifth marker on the X axis), etc.

In step 330, the computer program may determine a location of an interaction on the touch-sensitive interface. For example, if the user pauses movement on the touch-sensitive interface for a predetermined period of time (e.g., 1 second), taps on the touch-sensitive interface, or perform another define action (which may be specified by the user as a preference), in step 335, the computer program may receive a location of the touch, and may retrieve information for the element in that location. The computer program may then use the screen reader feature to audibly provide information on the point of interest.

If there are multiple data elements at the location, the computer program may apply a hierarchy in order to select the data element to provide information for. In another embodiment, the computer program may inform the user that there are multiple data elements near the point where the touch was sensed and the user may resize the display as discussed above.

Figure 4:
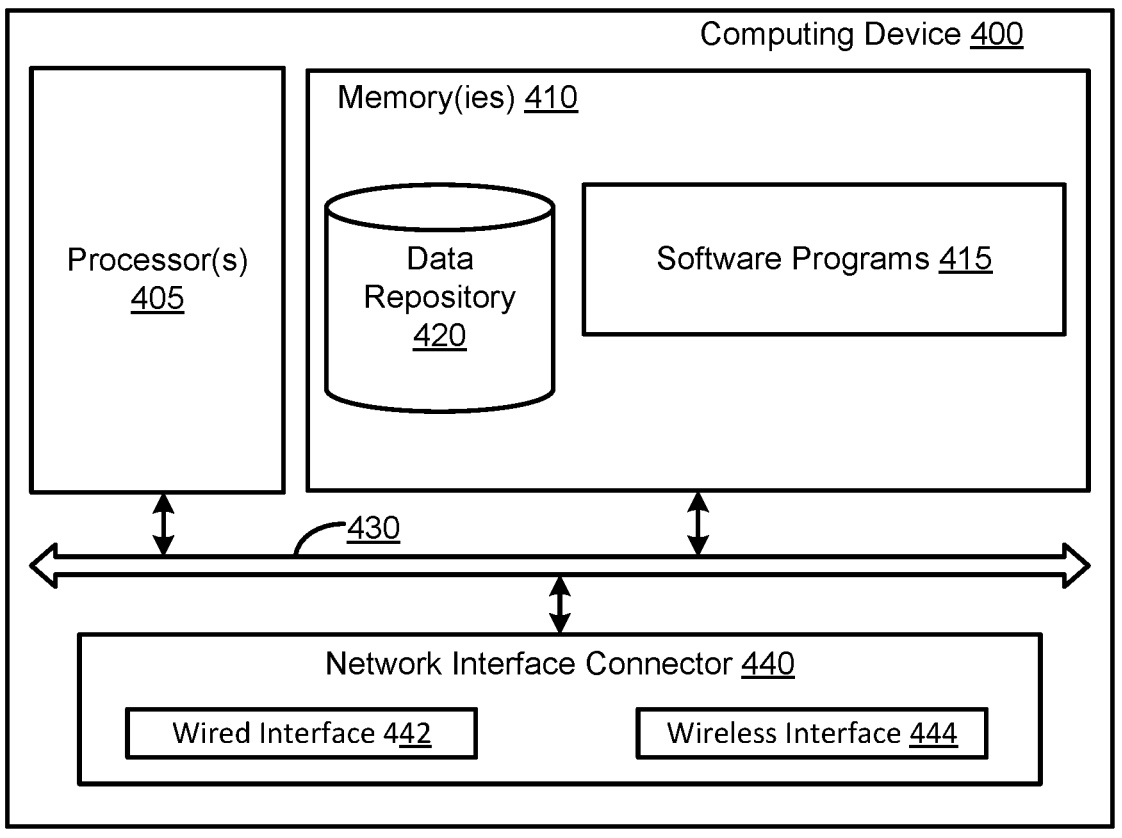
FIG. 4 depicts an exemplary computing system for implementing aspects of the present disclosure.

FIG. 4 depicts an exemplary computing system for implementing aspects of the present disclosure. FIG. 4 depicts exemplary computing device 400. Computing device 400 may represent the system components described herein. Computing device 400 may include processor 405 that may be coupled to memory 410. Memory 410 may include volatile memory. Processor 405 may execute computer-executable program code stored in memory 410, such as software programs 415. Software programs 415 may include one or more of the logical steps disclosed herein as a programmatic instruction, which may be executed by processor 405. Memory 410 may also include data repository 420, which may be nonvolatile memory for data persistence. Processor 405 and memory 410 may be coupled by bus 430. Bus 430 may also be coupled to one or more network interface connectors 440, such as wired network interface 442 or wireless network interface 444. Computing device 400 may also have user interface components, such as a screen for displaying graphical user interfaces and receiving input from the user, a mouse, a keyboard and/or other input/output components (not shown).

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope. Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method, comprising:

receiving, by a computer program executed by an electronic device, an identification of a stencil being used over a touch-sensitive interface associated with the electronic device from the stencil, the stencil comprising a plurality of physical markers, each physical marker comprising a raised portion, and a radio-frequency identifier, wherein the plurality of physical markers are arranged along an X-axis and a Y-axis, wherein physical markers of the plurality of physical markers in each column have a same shape and physical markers of the plurality of physical markers across different rows have different shapes or a repeating pattern;

adjusting, by the computer program, an axis scale of the X-axis or the Y-axis so that a minimum data value of the axis scale aligns with a first physical marker of the plurality of physical markers of the X-axis or the Y-axis and a maximum data value of the axis scale aligns with a last physical marker of the plurality of physical markers of the X-axis or the Y-axis;

retrieving, by the computer program, calibration data for the stencil from the radio-frequency identifier, wherein the calibration data comprises a location of each physical marker, wherein the computer program determines the location of each physical marker from an uploaded image of the stencil and compares it to the calibration data;

graphically presenting, by the computer program, a graphical representation of data on the touch-sensitive interface, wherein the data is graphically presented based on the calibration data and user touches are sensed based on the calibration data, wherein quadrant markers exists at a defined interval of a number of the plurality of physical markers for orientation of a locate marker or an element of interest, wherein the quadrant markers each have designated shapes;

receiving, by the computer program, a user touch interaction with the touch-sensitive interface;

providing, by the computer program, feedback for the user touch interaction;

determining, by the computer program, a location of the user touch interaction on the stencil;

identifying, by the computer program, the element of interest at the location; and audibly providing, by the computer program, information on the element of interest.

2. The method of claim 1, when the user touch interaction includes a selection of a range of interest of two physical landmarks within an axis, the computer program remaps values within the selection into a new temporal view context with respect to the two physical landmarks.

3. The method of claim 1, wherein at least one of the physical markers is represented by a virtual version at corresponding location on the touch-sensitive interface.

4. The method of claim 1, further comprising:

adjusting, by the computer program, the graphical representation of data based on a pixel density and a size of the touch-sensitive interface and the calibration data, wherein the computer program determines locations and sizes of the physical markers, datapoints, and interactive elements based on the pixel density and the size.

5. The method of claim 1, wherein

, while the user moves a finger over the touch-sensitive interface, the computer program plays a looping audio of a chorded sinewave and provides haptic feedback.

6. The method of claim 1, wherein

, when the user touch interaction includes a selection of datapoints by drawing a circle gesture on the touch-sensitive interface, the computer program defines a selection region based on the circle gesture and executes functions on the selection of datapoints within the selection region.

7. A system, comprising:

a stencil comprising a plurality of physical markers and a radio-frequency identifier, each physical marker comprising a raised portion, wherein the plurality of physical markers are arranged along an X-axis and a Y-axis, wherein physical markers of the plurality of physical markers in each row have a same shape and physical markers of the plurality of physical markers across each column have different shapes or a repeating pattern; and an electronic device comprising:

a computer processor;

a memory storing a computer program; and a touch-sensitive interface;

wherein, when read and executed by the computer processor, the computer program causes the computer processor to:

receive the radio-frequency identifier from the stencil, retrieve calibration data for the stencil from the radio-frequency identifier, wherein the calibration data comprises a location of each physical marker, wherein the computer program determines the location of each physical marker from an uploaded image of the stencil and compares it to the calibration data,

graphically present a graphical representation of data on the touch-sensitive interface, wherein quadrant markers exists at a defined interval of a number of the plurality of physical markers for orientation of a locate marker or an element of interest, wherein the quadrant markers each have designated shapes, wherein the data is graphically presented based on the calibration data, adjust an axis scale of the X-axis or the Y-axis so that a minimum data value of the axis scale aligns with a first physical marker of the plurality of physical markers of the X-axis or the Y-axis and a maximum data value of the axis scale aligns with a last physical marker of the plurality of physical markers of the X-axis or the Y-axis, receive a user touch interaction with the touch-sensitive interface, provide feedback for the user touch interaction, determine a location of the user touch interaction on the stencil, identify the element of interest at the location, and cause information to be audibly provided on the element of interest.

8. The system of claim 7, when the user touch interaction includes a selection of a range of interest of two physical landmarks within an axis, the computer program remaps values within the selection into a new temporal view context with respect to the two physical landmarks.

9. The system of claim 7, wherein at least one of the physical markers is represented by a virtual version at corresponding location on the touch-sensitive interface.

10. The system of claim 7, wherein when read and executed by the computer processor, the computer program causes the computer processor to adjust the graphical representation of data based on a pixel density and a size of the touch-sensitive interface and the calibration data, wherein the computer program determines locations and sizes of the physical markers, datapoints, and interactive elements based on the pixel density and the size.

11. The system of claim 7, wherein, for one physical marker of the plurality of physical markers, the computer program announces a position of the marker within the scale and a count of datapoints within its view, including, for X-axis markers, a count of points within a column space above the one physical marker and, for Y-axis markers, a count of points within a row space to a right of the one physical marker.

12. The system of claim 7, wherein each physical marker is associated with an action item of a graphical user interface, and the computer program audibly provides information on the action item at a physical marker's intersection.

13. A method, comprising:

receiving, by a computer program executed by an electronic device, an identification of a stencil being used over a touch-sensitive interface associated with the electronic device from the stencil, the stencil comprising a first group of physical markers in a first axis, and a second group of physical markers in a second axis, and an optical identifier, each physical marker comprising a raised portion, wherein the each physical marker is arranged along an X-axis and a Y-axis, wherein the each physical marker in a column has a same shape and the each physical marker across different rows have different shapes or a repeating pattern;

retrieving, by the computer program, calibration data for the stencil from the optical identifier, wherein the calibration data comprises a location of each physical marker, wherein the computer program determines the location of the each physical marker from an uploaded image of the stencil and compares it to the calibration data;

graphically presenting, by the computer program, a graphical representation of data on the touch-sensitive interface, wherein the data is graphically presented based on the calibration data, wherein quadrant markers exists at a defined interval of a number of the each physical marker for orientation of a locate marker or an element of interest, wherein the quadrant markers each have designated shapes;

receiving, by the computer program, a user touch interaction with the touch-sensitive interface;

providing, by the computer program, feedback for the user touch interaction;

determining, by the computer program, a location of the user touch interaction on the stencil;

identifying, by the computer program, the element of interest at the location; and audibly providing, by the computer program, information on the element of interest.

14. The method of claim 13, further comprising:

adjusting, by the computer program, the graphical representation of data based on a pixel density and a size of the touch-sensitive interface and the calibration data, wherein the computer program determines locations and sizes of the physical markers, datapoints, and interactive elements based on the pixel density and the size.

\*    \*    \*    \*    \*